F. W. BATTERSHALL.
RESILIENT TIRE.
APPLICATION FILED DEC. 13, 1912.

1,242,640.

Patented Oct. 9, 1917.

UNITED STATES PATENT OFFICE.

FLETCHER W. BATTERSHALL, OF ALBANY, NEW YORK.

RESILIENT TIRE.

1,242,640.  Specification of Letters Patent.  Patented Oct. 9, 1917.

Application filed December 13, 1912. Serial No. 736,458.

*To all whom it may concern:*

Be it known that I, FLETCHER W. BATTERSHALL, of Albany, in the county of Albany and in the State of New York, have invented a certain new and useful Improvement in Resilient Tires, and do hereby declare that the following is a full, clear, and exact description thereof.

The object of my invention has been to provide a tire which, without the use of compressed air, shall have, among others, the following advantages:

That it shall be capable of using both the tensile, compressive and shearing strength of rubber, of which it may be made, and in such a manner that the relative proportions of these qualities may be regulated; and that it shall be capable of tipping sidewise to permit yielding to side shocks; and that such tire, while being resilient to light vertical shocks, shall be capable of supporting heavy loads; and to such ends my invention consists in the resilient tire hereinafter specified.

In the accompanying drawings—

Figure 1:
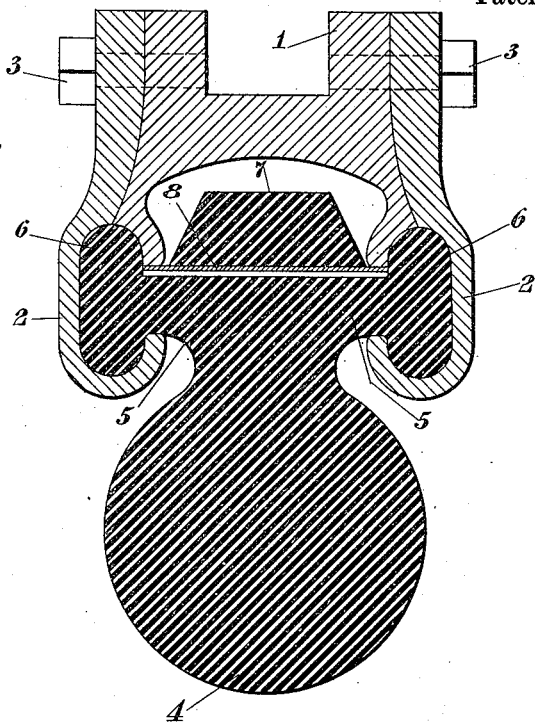
Figure 2:
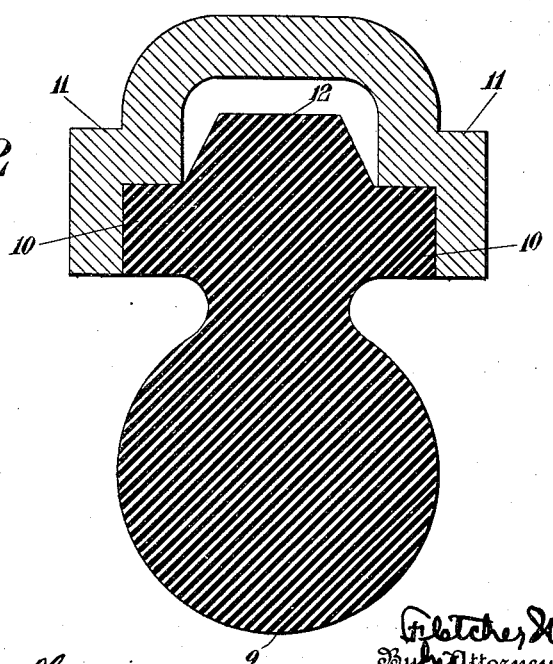

Figures 1 and 2 are cross-sections, respectively, of wheel rims and different embodiments of my invention.

While I shall illustrate my invention by several embodiments thereof, it is to be understood that such embodiments are illustrative merely of the principles of my invention, and that the invention is capable of embodiment in many different forms, and I am not to be restricted to the particular forms illustrated.

In the form of my invention shown in Fig. 1, I have provided a wheel rim 1 with side flanges 2 which are secured thereto as by bolts 3. My rubber tire is provided with a tread 4, which is connected to a body having side arms 5 which, in this instance, are provided with beads 6 on their outer ends. The said beads fit into channels formed by the flanges 2 and the rim 1. The body preferably has a base 7. In the present instance I have shown springs 8 extending through the body of the rubber tire and resting on the rim, which springs in the present instance are shown as flat, but which might be of many other forms, or the springs might be omitted.

In the use of my tire the weight causes the rim to descend toward the tread, which brings into play one or more of three qualities in the tire. First, it tends to force the rim toward the body of the tire, putting the cross-arms 5, in the present instance, under tension, as they are held apart by the channels in the metal engaging the beads on the ends of the arms. Second, the rubber of the arms is to some extent, at least, compressed by the bearing of the rim upon them; and third, there is a tendency to shearing the arms off the body. By proportioning the widths and lengths of the arms, and the relative positions of the beads and the arms, it will readily be understood that the amount of strain taken up by each of these qualities of the rubber can be proportioned as desired. The springs 8 tend to resist the lighter shocks upon the tire and to make it more resilient. When a heavy blow comes upon the tire the rim is forced down until it rests upon the base 7 of the body, in which condition the tire can sustain a very heavy load without danger of breaking the arms 5.

Under side shocks to the tire the thread can tilt laterally to a considerable extent by the yielding of the arms 5, one up and the other down, and the bending of the tread itself, and thus the tire can endure shocks which would otherwise break it.

In the form of my invention shown in Fig. 2, the beads and springs of Fig. 1 are omitted and a simpler construction is obtained. In such tire the thread 9 is supported upon arms 10 which rest in rabbets 11 formed in the rim, and the body has a base 12 like the base 7 of Fig. 1. In this case the tensile strain on the rubber is very largely eliminated and the forces are resisted by the simple bending of the arms 10.

I claim—

1. A resilient tire consisting of the combination of a rubber tire and a metal rim, said tire having a tread supported by cross-arms, said cross-arms resting on shoulders on the rim on opposite sides of the tire, and having a base normally out of contact with the rim but capable of contacting therewith under shock, flat springs passing through said base and resting on said shoulders and supporting said tire.

2. A resilient tire comprising a rubber tire and a metal rim, said tire consisting of a tread supported upon cross-arms having beads at their outer ends, said rim having means for inclosing said beads, said body having a base normally out of contact with said rim but capable of resting thereon under shock, and springs passing through said base and resting on said rim.

In testimony that I claim the foregoing I have hereunto set my hand.

FLETCHER W. BATTERSHALL.

Witnesses:
    AUSTIN B. GRIFFIN,
    HARRIETT B. QUINTANA.